US006290377B1

(12) United States Patent
Hulse

(10) Patent No.: US 6,290,377 B1
(45) Date of Patent: *Sep. 18, 2001

(54) PNEUMATICALLY TELESCOPING MAST HAVING DC OPERATED LIGHTING AND PIVOTING MEANS

(75) Inventor: John A. Hulse, Akron, OH (US)

(73) Assignee: The Will-Burt Company, Orrville, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/383,428

(22) Filed: Aug. 27, 1999

Related U.S. Application Data

(63) Continuation-in-part of application No. 09/053,471, filed on Apr. 1, 1998, now Pat. No. 5,980,070, which is a continuation of application No. 08/585,944, filed on Jan. 16, 1996, now Pat. No. 5,743,635.

(51) Int. Cl.[7] .................................................... F21V 21/22

(52) U.S. Cl. ........................... 362/385; 362/419; 52/115; 52/118; 52/119

(58) Field of Search .................................... 362/523, 524, 362/190, 191, 192, 385, 74, 419, 294, 285–290, 418; 52/28, 110–118, 143, 119

(56) References Cited

U.S. PATENT DOCUMENTS

| 143,182 | 9/1873 | Pierson . |
| 301,019 | 6/1884 | Teal . |
| 456,382 | 7/1891 | McPartland . |
| 713,911 | 11/1902 | McPartland . |
| 722,552 | 3/1903 | Anderson . |
| 1,035,570 | 8/1912 | Gary et al. . |
| 1,183,960 | 5/1916 | Ecker et al. . |
| 1,261,112 | 4/1918 | Fay et al. . |
| 1,271,391 | 7/1918 | Trojan . |
| 2,616,768 | 11/1952 | Stemm . |
| 3,296,757 | 1/1967 | Goodman . |
| 4,337,560 | 7/1982 | Slysh . |
| 4,413,451 | * 11/1983 | Featherstone et al. .................. 52/28 |
| 4,488,209 | 12/1984 | Gosswiller . |

(List continued on next page.)

FOREIGN PATENT DOCUMENTS

| 257 063 | 11/1911 | (DE) . |
| 0 379 335 | 1/1990 | (EP) . |
| 0 462 503 | 6/1991 | (EP) . |
| 2 592 026 | 12/1985 | (FR) . |
| 2 193 395 | 2/1988 | (GB) . |
| 2 277 213 | 10/1994 | (GB) . |

OTHER PUBLICATIONS

Woodway Engineering, Limited, Brochure—*Hy–Lite*, Sep. 11, 1996.

Primary Examiner—Thomas M. Sember
Assistant Examiner—Ismael Negron
(74) Attorney, Agent, or Firm—Vickers, Daniels & Young

(57) ABSTRACT

An improved pneumatically telescoping mast supported for pivotal movement in opposite directions is provided. The mast includes adjacent telescoping sections slidable relative to one another between retracted and extended positions. A pneumatic control system for displacing the mast sections between the retracted and extended positions is also provided, as is a mechanical arrangement for pivoting the mast between generally horizontal and vertical positions. The mechanical arrangement includes a drive mechanism operable independently from the pneumatic control system which is capable of securely maintaining the mast at any desired angle between the horizontal and vertical positions. The mast includes an AC powered light source mounted at the upper end of the mast. The improvement of the mast comprising the inclusion of a converter for converting DC power to AC power so that the light source has the capability to run on the same DC power source as the pneumatic control system and the arrangement for pivoting the mast.

52 Claims, 7 Drawing Sheets

U.S. PATENT DOCUMENTS

| | | |
|---|---|---|
| 4,566,714 | 1/1986 | De Witt et al. . |
| 4,594,824 | 6/1986 | Ziegler et al. . |
| 4,600,980 | 7/1986 | Dahlgren . |
| 5,066,866 | 11/1991 | Halliday . |
| 5,102,375 | 4/1992 | Featherstone . |
| 5,107,672 | 4/1992 | Featherstone . |
| 5,139,464 | 8/1992 | Lehnert . |
| 5,168,679 | 12/1992 | Featherstone . |
| 5,203,746 | 4/1993 | Lehnert . |
| 5,572,837 * | 11/1996 | Featherstone et al. ................. 52/118 |
| 5,743,635 * | 4/1998 | Hulse et al. .......................... 362/385 |

* cited by examiner

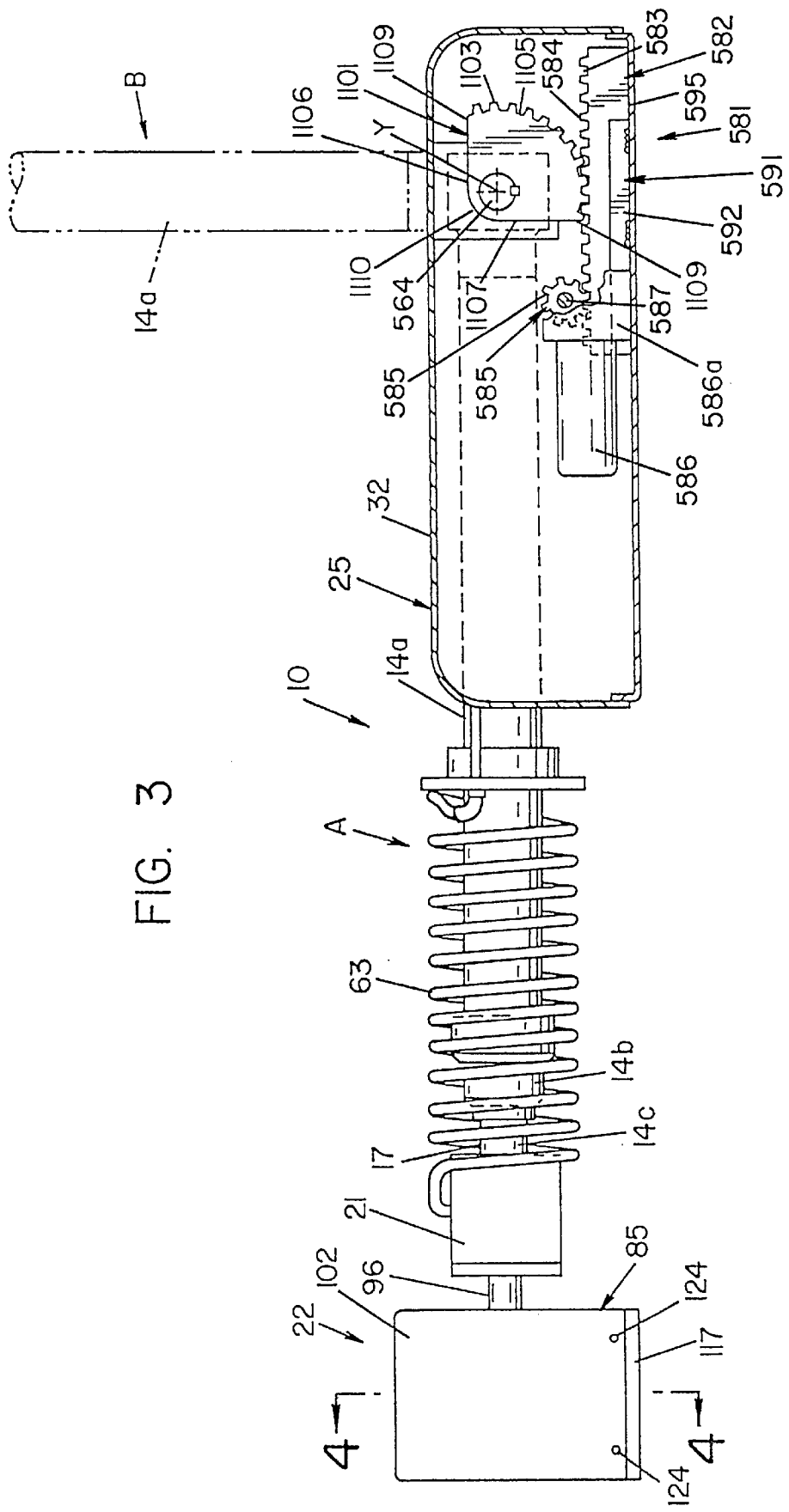

PNEUMATICALLY TELESCOPING MAST HAVING DC OPERATED LIGHTING AND PIVOTING MEANS

This application is a continuation-in-part of application Ser. No. 09/053,471, filed Apr. 1, 1998, now U.S. Pat. No. 5,980,070 which in turn is a continuation of application Ser. No. 08/585,944, filed Jan. 16, 1996, now U.S. Pat. No. 5,743,635.

The present invention relates to an improvement in pneumatically telescoping masts utilizing a single DC power supply for the light source in combination with other power requirements of the mast.

INCORPORATION BY REFERENCE

Featherstone U.S. Pat. No. 5,572,837 is incorporated by reference herein so that pneumatically actuated telescoping masts known in the art need not be described in detail hereinafter.

BACKGROUND OF THE INVENTION

A pneumatically actuated telescoping mast is well known in the prior art and is generally of such a nature that it may be mounted readily on the roof of a motor vehicle, such as an emergency vehicle or utility vehicle. In such arrangement the mast is generally used for positioning electrical devices, particularly lighting fixtures at an elevated point above the vehicle. The effect is to immediately light a large area above the vehicle. This allows that emergency procedures can be conducted under the light, such as at accident scenes or by utility work crews such as after a storm. Pneumatically actuated telescoping masts are particularly advantageous in such situations since they are light weight, compact in a retracted position and capable of being mounted on the roof of most emergency motor vehicles, including automobiles.

The prior art pneumatically telescoping masts are extended using air, under pressure, and in a fully extended position, are generally vertical. A pneumatic telescoping mast typically includes a compressor or other pneumatic control means which displaces telescoping mast sections between retracted and extended positions. Additionally, a pneumatically telescoping mast may also include a mechanism for pivoting the mast between horizontal and vertical positions. Such an arrangement is disclosed in U.S. Pat. No. 5,572,837 assigned to the assignee of the present invention.

In many applications the pneumatic control mechanism is powered by an air compressor, connected to a DC power source and the mechanism for pivoting the mast is controlled by a DC motor located adjacent to the platform base from which the mast is raised. Alternatively, the air compressor for inflating the mast can be provided with power from an AC power source. However, where the telescoping mast is provided with a light source at the end, the light has been always necessarily powered by an AC power source. AC power has always been required because of the light intensity used on telescoping masts. Either a 110 volt or 220 volt power source has been required in order to provide adequate lighting intensity in which emergency personnel can work effectively.

Such an AC power source is generally run by a gasoline generator hooked to an alternator which then is attached to the light source via an electrical line. Generally speaking, the AC power source has been provided by the motor vehicle itself, though a self contained generator is possible. An AC power source generally requires that the vehicle or generator continue to run at all times to operate the light source. During an emergency situation in which the light is needed for rescue or other purposes, it is important that the generator or vehicle not run out of gas. If the gasoline supply is exhausted, the generator will shut down and the lights automatically turn off.

Two different types of AC power sources are generally used for pneumatically telescoping masts. The most typical has the power line running directly from the emergency vehicle alternator to the light source. Therefore, the emergency vehicle provides power to the light via the alternator, while the remainder of pneumatic mast functions run on DC power. The other AC power option involves providing a separate self-contained gasoline generator and alternator. However, such a unit is not typically seen since a self-contained generator and alternator would not only be redundant to the vehicle alternator, but also too heavy to be mounted on the roof of most emergency vehicles. As is well known and can be seen in the prior art, AC power requires heavy duty wiring insulation to protect against fire or electrical shock. This results in more bulk and weight added to the mast, since the wiring must be pulled up and pushed down during extension and retraction of the mast. As such, the extension and retraction mechanisms need to have a larger capacity and need to work harder than what otherwise might be required. This is especially true with variations in temperature. For instance, cold temperatures result in typical wiring insulation becoming less flexible and elastic, thereby requiring the extension and retraction mechanisms to work even harder to pull wire up the mast as the mast is being extended.

Certain systems of prior art telescoping masts already use 12 volt DC power as the preferred power source. These systems include the pneumatic control mechanism. Generally these systems can run and be directly wired to the vehicle battery. However, in some cases, these same mast systems may be powered with self-contained DC power which is not connected to the vehicle at all. Thus, the pneumatic control mechanism or compressor and the mechanism for pivoting the mast typically runs on lower power than the light (12V or 24V DC as opposed to 110V or 220V AC) and indeed can be run on self-contained DC power. However, since the light must be run on AC power, the light is necessarily connected to the power generating system of the emergency vehicle at all times. Thus, the pneumatically telescoping masts are not readily transferrable to other emergency vehicles since they must be integrally connected to the AC power source of the host vehicle. The internal components of an AC system are spread out across the entire pneumatic mast. This increases manufacturing costs and time required for initial assembly. As such, the light fixture at the end of a telescoping mast powered by an AC power source is also not easily interchangeable with other types of devices which could be placed on the antenna. For instance, such devices may include transmitting or receiving antennas, location devices or signal devices. The installation of a different electrical fixture usually requires complete rewiring of the fixture, which is necessarily complicated. Even the replacement of the light is also complex and complicated. Such designs do not meet current demands of versatility and interchangability.

SUMMARY OF THE INVENTION

Accordingly, it is a feature of the present invention to provide a pneumatically telescoping mast which overcomes the disadvantages of prior art pneumatically telescoping masts in that a telescoping mast is economically manufactured and assembly is simplified by combining the electrical components to rely upon only one DC power system. The invention allows a telescoping mast and the utility light thereon to be operated by the same power source as the pneumatic control system or mast pivoting system, thereby simplifying overall design and increasing the flexibility of uses.

This feature, along with other features of the present invention, is achieved in a pneumatically telescoping mast supported for pivotal movement in opposite directions about a horizontal mast axis, the mast including adjacent telescoping sections slidable relative to one another between retracted and extended positions. A pneumatic control mechanism is provided for displacing the mast sections between the retracted and extended positions. A pivoting mechanism is also provided which allows and controls the mast to pivot about an axis between horizontal and vertical positions. The pivoting mechanism includes a drive wheel and a motor for rotating the drive wheel in opposite directions. A linkage interconnects the drive wheel and the mast for rotation of the drive wheel in one of the opposite directions to pivot the mast toward the vertical position and for rotation of the drive wheel in the opposite direction to pivot the mast toward the horizontal position. The mast includes a light source mounted to one of the telescoping sections and a DC power supply which provides electrical power to the light source as well as providing power to other power portions of the telescoping mast.

In accordance with the more specific feature of the invention, the DC power supply also provides power to the pivoting mechanism and the pneumatic control mechanism or compressor. An electronic inverter is provided adjacent the light source to convert the DC power to AC power directly at the light mount. In a preferred embodiment, the light source and the electronic inverter are provided in a single enclosed module. The module includes a heat sink which is adjacent the electronic inverter. The heat sink is also removable as a unit together with the electronic inverter.

The DC power supply may be of any standard DC power supply including a 12 volt battery, or a 24 volt supply. In one embodiment the DC power may be provided by the vehicle battery which is kept charged and recharged by the engine and alternator of the vehicle.

In accordance with another aspect of the invention, the telescoping mast is provided with a DC motor mechanism which includes a first motor for moving the lighting source horizontally and a second motor for moving the lighting source vertically relative to the stationary position of the mast. In a preferred embodiment of the invention, the light source is a metal halide light source which provides the largest amount of lighting intensity, as measured in lumens, for the amount of DC power required.

Thus, it is a principal object of the present invention to provide a pneumatically telescoping mast with an improved light source at its end which obtains power from a DC power supply.

It is yet another object of the present invention to provide a pneumatically actuated telescoping mast with a utility light and other electrical power requirements of the mast, all powered by a DC power supply.

Still another object of the present invention is to provide an improved pneumatically actuated telescoping mast which utilizes more reliable power sources than other telescoping masts and which does not require an AC power source.

Yet another object of the invention is to provide an improved pneumatically telescoping mast which will not abruptly shut down when a vehicle engine power source is turned off.

Still yet another object of the invention is to provide an improved pneumatically operated telescoping mast in which the wiring hook-up to the light source can be made with lighter and less expensive wiring, thus reducing air pressure requirements to extend and retract the mast, reduce weight along the length of the mast and reduce motor load and motor burnout in the pivot mechanism.

Further, another object of the present invention is to provide a telescoping mast utility light as a single enclosed module.

It is yet another object of the invention to provide an improved pneumatically operated telescoping mast which is capable of pivoting between a generally horizontal position and a generally vertical position, and wherein the pivoting does not operably rely on and is independent operable from the pneumatic control system used to extend the mast.

Yet another object of the invention is to provide an improved pneumatically operated telescoping mast pivoting mechanism which utilizes less space, is easier to maintain, and requires less power than alternative pneumatically telescoping mast pivoting mechanisms.

These and other objects of the invention will become apparent to those skilled in the art upon reading and understanding the following detailed description of preferred embodiments.

BRIEF DESCRIPTION OF THE DRAWINGS

The invention may take physical form in certain parts and arrangement of parts, preferred embodiments of which will be described in detail and illustrated in the accompanying drawings which form a part hereof and wherein:

FIG. 3 is an elevation view of the telescoping mast, partially in section, of the present invention;

THE PREFERRED EMBODIMENT

Figure 1:
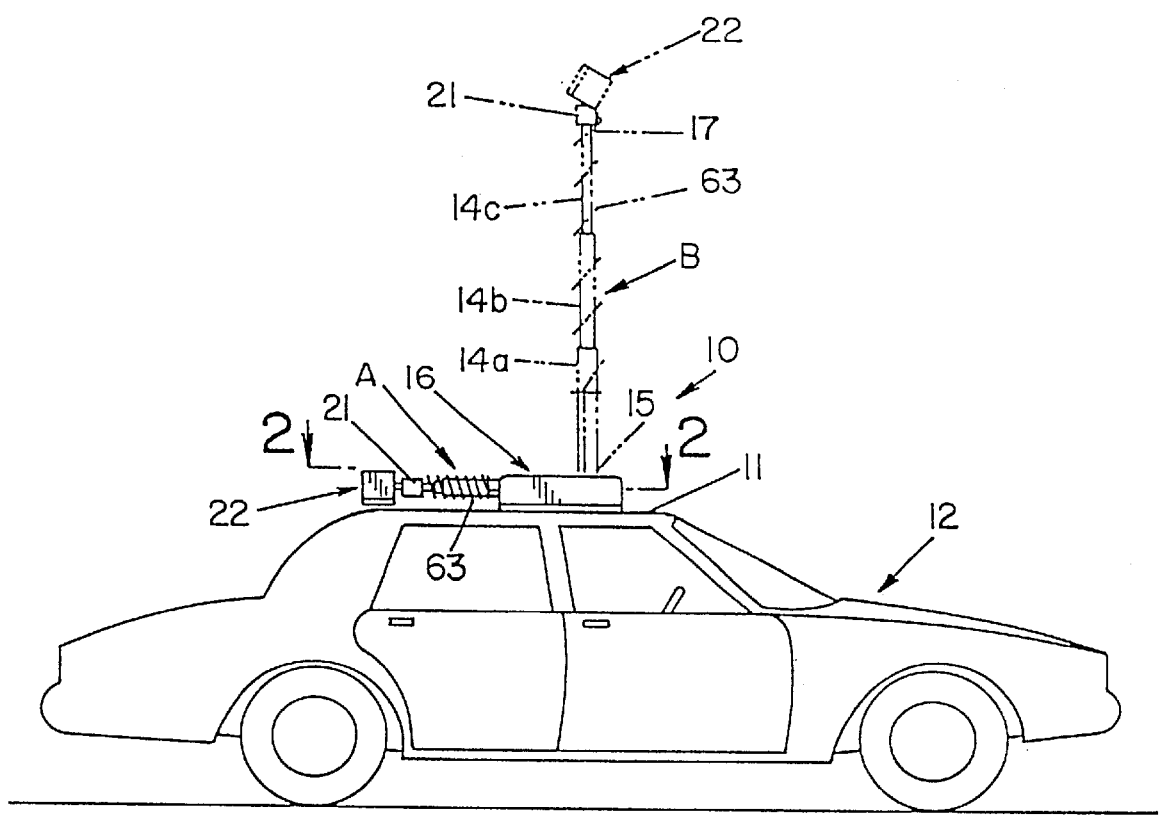
FIG. 1 is a pictorial view illustrating the pneumatically telescoping mast of the present invention.

Referring to the drawings, wherein the showings are for the purpose of illustrating the preferred embodiment of the invention only and not for the purpose of limiting same, FIG. 1 shows a telescoping mast 10 mounted on the roof 11 of a motor vehicle 12. Mast 10 is shown at rest or at a traveling position, identified by arrow A, parallel to roof 11. Mast 10 is shown in phantom lines in an extended vertical position, arrow B, perpendicular to roof 11. In accordance with the present invention, the mast is capable of being placed at a tilt angle between 0 and 90° where, for the purpose of this description, 0° is defined as being parallel with vehicle roof 11 and generally horizontal, as at position A, while 90° is perpendicular to vehicle roof 11 and in a generally vertical position, in accordance with position B.

As shown at position B, telescoping mast 10 is comprised of the adjacent telescoping sections 14a–14c. In the preferred embodiment, telescoping section 14a is at the lower mast end 15 of mast 10 and is pivotally mounted to the base 16 which is then mounted to vehicle roof 11. Each of telescoping sections 14a–14c are relatively rigid tubular sections facilitating the pneumatic extension and retraction of telescoping mast 10. Mounted at the upper mast end 17, at telescoping section 14c, is a wiring box assembly 21 to facilitate the placement of utility light 22 at upper mast end 17.

Figure 2:
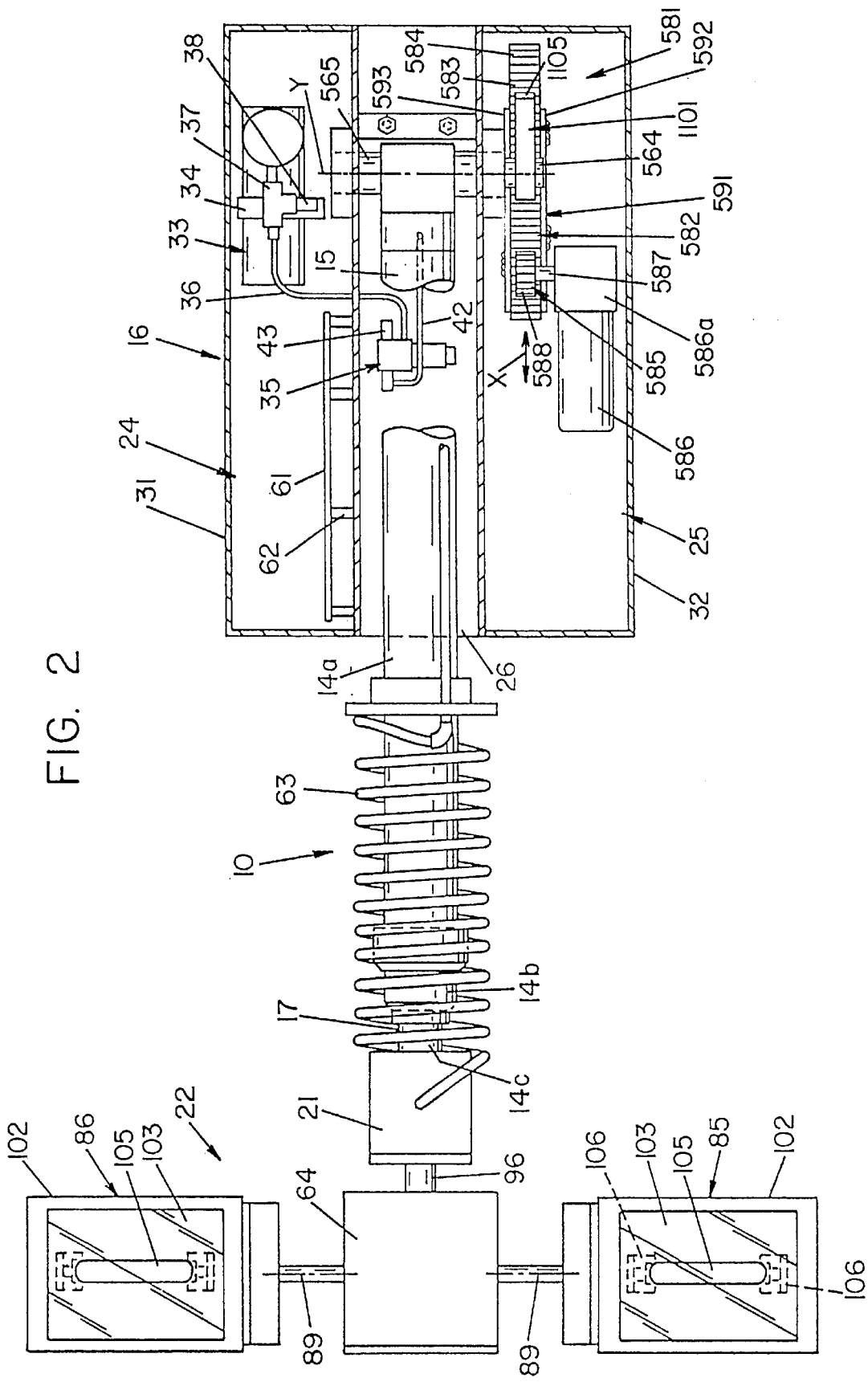
FIG. 2 is a plan view of the telescoping mast, partially in section, taken along line 2—2 of FIG. 1.

As best shown in FIG. 2, base 16 includes the two rectangular enclosures 24 and 25 forming a channel 26 therebetween in which telescoping mast 10 is placed. Each of rectangular enclosures 24, 25 include the perimeter walls 31 and 32, respectively. Contained within enclosure 24 is an air compressor 33 used to inflate telescoping mast 10. Preferably, this compressor is capable of obtaining 35 psi and runs on 12 volt DC power. Compressor 33 is mounted to base 16 via the bracket 34. Air from compressor 33 is supplied to an up/down solenoid valve 35 through a polyethylene air supply tube 36 and is controlled by check valve 37 and the pressure release valve 38. Solenoid valve 35 controls the extension and retraction of mast 10 through a polyurethane supply tube 42 with air pressure controlled by a metering valve 43 on solenoid valve 35.

Contained within rectangular enclosure 25 is a rack and pinion system 581. Included within rack and pinion system 581 is a rack 582 having gear teeth 583 on an upper face 584 for interengaging a pinion 585 which is driven by a motor 586 through a gearbox 586a. As pinion 585 is rotated by gearbox shaft 587, rack 582 slides back and forth in the directions shown by arrow X. Rack 582 slides within a track 591 formed by plates 592, 593 welded to base 16 of mast 10. Thus, gear teeth 583 of rack 582 interengage with teeth 588 of pinion 585 while a lower face 595 of rack 582 is in contact with and slides along base 16.

Interengaging with rack 582 is a gear segment 1101. Gear segment 1101 is keyed or otherwise mounted on a journal portion 564 of a pivot pin 565. Thus, rotation of gear segment 1101 causes journal portion 564 to rotate causing mast 10 to pivot about axis Y. Gear segment 1101 has an angular extent slightly greater than 90° and has an outer arc-shaped surface 1103 coaxial with axis Y. Surface 1103 includes gear teeth 1105 interengaging with gear teeth 583 of rack 582. Gear segment 1101 also includes radial surfaces 1106 and 1107 having corresponding radially outer and inner ends 1109 and 1110, respectively. Preferably, teeth 1105 encompass an angle greater than 90° and preferably an angle of approximately 130°. However, radial surfaces 1106 and 1107 preferably have an included angle therebetween of 90°, whereby surfaces 1106, 1107 are perpendicular to one another. The shape of gear segment 1101 allows rotation through 90°, and thus pivoting of mast 10 through 90° while maintaining gear segment 1101 within rectangular closure 25.

Rack and pinion system 581 operates in the following manner. Motor 586 is activated and preferably draws power from the battery of emergency vehicle 12 in order that mast 10 pivots from its resting, generally horizontal position as shown in FIG. 1. Rotation of gearbox shaft 587 in the clockwise direction in FIG. 3 causes pinion 585 mounted thereon to drive rack 582 to the left in FIG. 3. Gear teeth 583 engage gear teeth 1105 on gear segment 1101 causing gear segment 1101 and thus journal portion 564 to rotate in a clockwise direction. Such rotation of journal portion 564 causes mast 10 to pivot clockwise about axis Y towards a vertical position. By deenergizing motor 586, the pivoting of mast 10 may be stopped at any tilt angle position between 0° and 90°. The interengagement between gear teeth 588 of pinion 585 and gear teeth 583 of rack 582 together with the interengagement of gear teeth 583 with gear teeth 1105 of gear segment 1101 keep mast 10 fixed at any tilt angle desired between 0° to 90°. The interengaging gear teeth provide the mechanical force necessary to keep mast 10 in the tilt angle position. The process described above is reversed in order to lower mast 10 to the generally horizontal position.

Figure 3A:
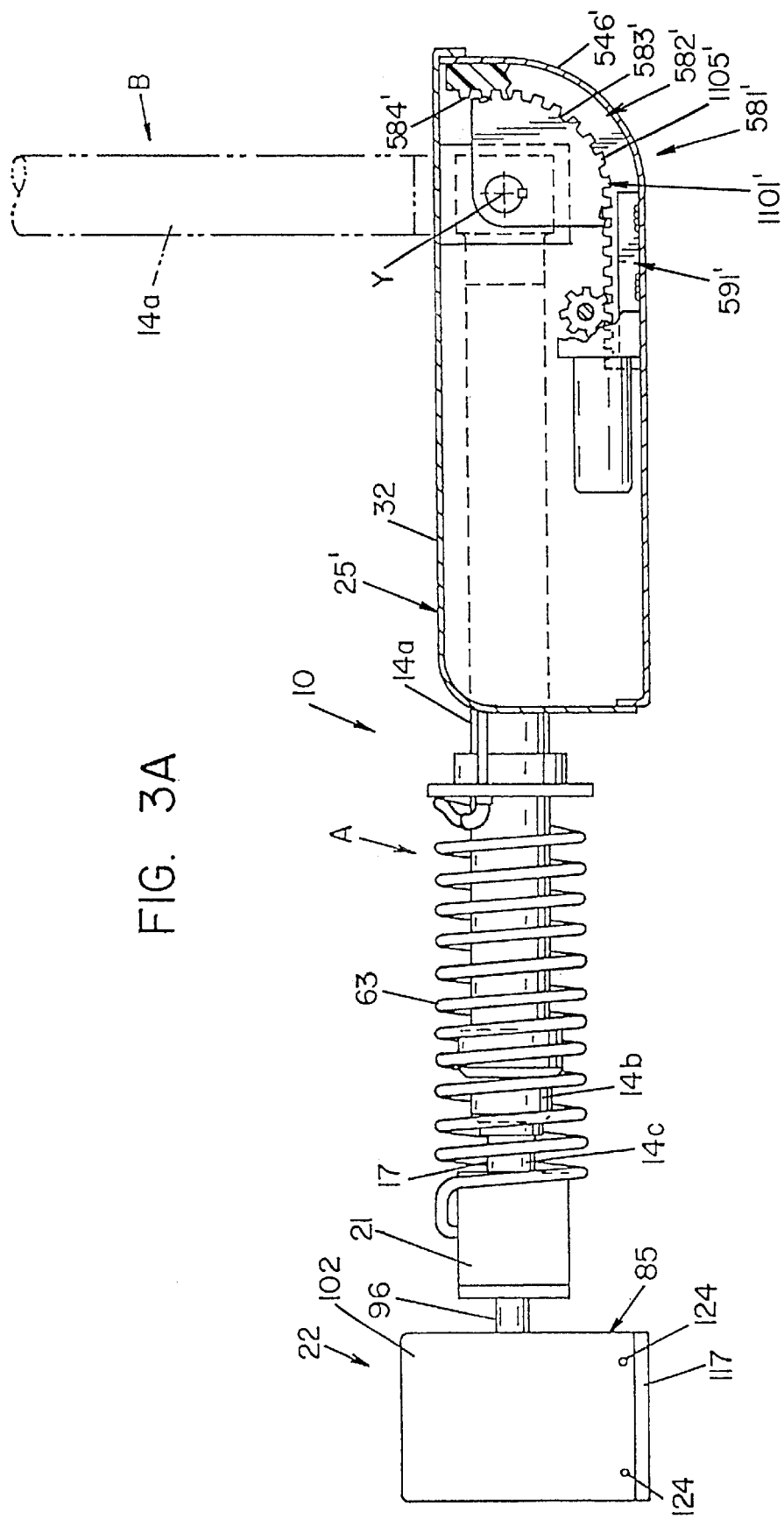
FIG. 3a is an elevation view of an alternative embodiment of the telescoping mast, partially in cross-section, of the present invention.

In an alternative embodiment, as best shown in FIG. 3A, the rack and pinion system 581 of FIG. 3, and each of its components, is shown as rack and pinion system 581'. Rack and pinion system 581' is nearly identical to rack and pinion system 581 with the following modifications. Rack 582' is manufactured from a flexible material such as a plastic, in order that it is capable of bending and forming an arc. Track 591' has an arcuate shape defined by a radius having a center at axis Y. Rack 582' includes gear teeth 583' along its upper face 584'. A transverse side wall 546' is also arc-shaped and forms the outer arc surface of track 591'. Rack and pinion system 581' operates like rack and pinion system 581, with the exception that gear teeth 583' at rack 582' interengage gear teeth 1105' of gear segment 1101' along 90° of the angular extent thereof. By increasing the interengaging surface area between gear segment 1101' and rack 582', telescoping mast 10 can be more positively driven between its generally horizontal position at 0° and its generally vertical position at 90°. Further mast 10 is more securely maintained at any one of the selected angles between 0° and 90°. Thus, it is possible to provide a longer telescopic mast 10 or a heavier utility light 22 at upper mast end 17 of mast 10 since rack and pinion system 581' is capable of withstanding greater forces exerted thereon by an extended inclined mast 10. Further, as will be appreciated from FIG. 3A, rack and pinion system 581' is completely enclosed within rectangular enclosure 25'.

Figure 6:
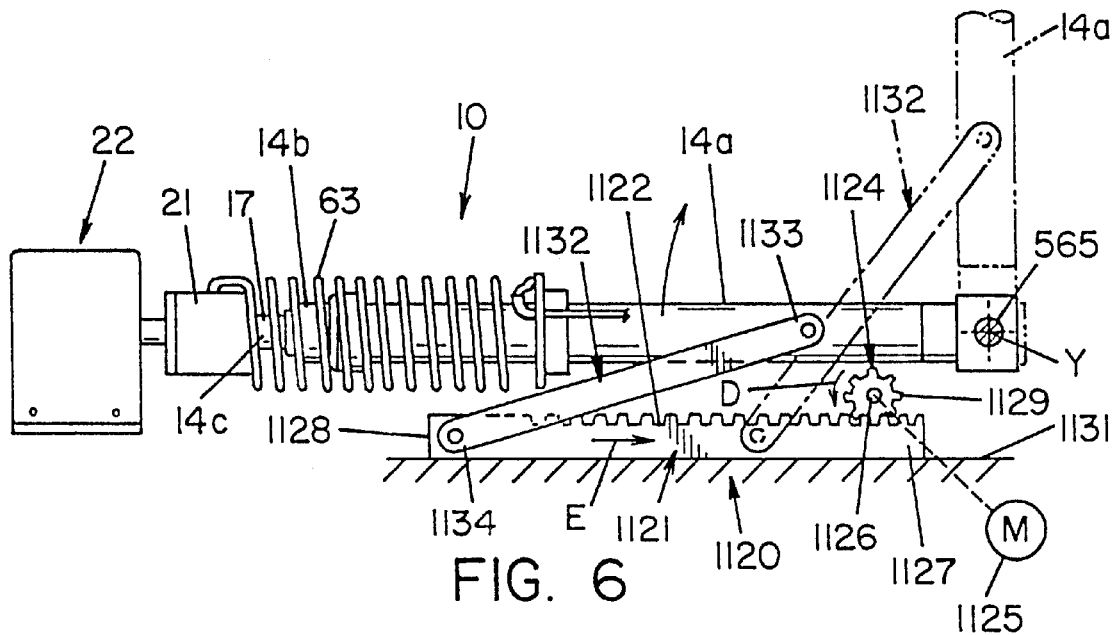
FIG. 6 is an elevation view showing another alternative embodiment from that of FIGS. 3 and 3a of the present invention; and, FIG. 7 is another alternative view from that shown in FIGS. 3, 3a and 6 of the present invention.

FIG. 6 shows an alternative rack and pinion system 1120. As shown, system 1120 includes a rack 1121 having gear teeth 1122 on the upper face thereof for interengaging with gear teeth 1129 of a pinion 1124. A drive shaft 1126 upon which pinion 1124 is mounted is driven by a motor 1125. Rack 1121 slides within a track 1131 similar to track 591 shown in FIGS. 2 and 3. Also included within rack and pinion system 1120 is a lever arm 1132 having a mast end 1133 and a rack end 1134. Mast end 1133 is pivotally attached to section 14a of mast 10. Rack 1121 has a first end 1127 and a second opposite end 1128. First end 1127 is adjacent pivot pin 565 when mast 10 is in a generally horizontal position, and rack end 1134 of lever arm 1132 is pivotally attached to rack 1121 adjacent second end 1128.

As will be appreciated from FIG. 6, rack and pinion system 1120 operates to raise mast 10 from its horizontal position by motor 1125 driving shaft 1126 and pinion 1124 thereon in a counterclockwise direction as shown by the arrow D. Gear teeth 1129 of pinion 1124 interengage with gear teeth 1122 of rack 1121 to slide rack 1121 within track 1131 in the direction of arrow E. Since mast 10 is adapted to pivot about axis Y in the manner shown in FIGS. 2 and 3, such sliding displacement of rack 1121 causes lever arm 1132 to pivot counterclockwise relative to the rack as rack end 1134 approaches pinion 1124. The lifting motion of lever arm 1132 causes mast 10 to pivot clockwise about axis Y and move from the generally horizontal position, or 0° position, through a plurality of angles to the generally vertical position, or 90°, shown in phantom. Lever arm 1132 is also shown in phantom in this position. Interengagement between pinion 1124 and rack 1121 allows mast 10 to be securely maintained at any of a plurality of angles between the generally horizontal position and the generally vertical position shown in phantom. In order to lower mast 10, the elevating procedure is reversed.

Figure 7:
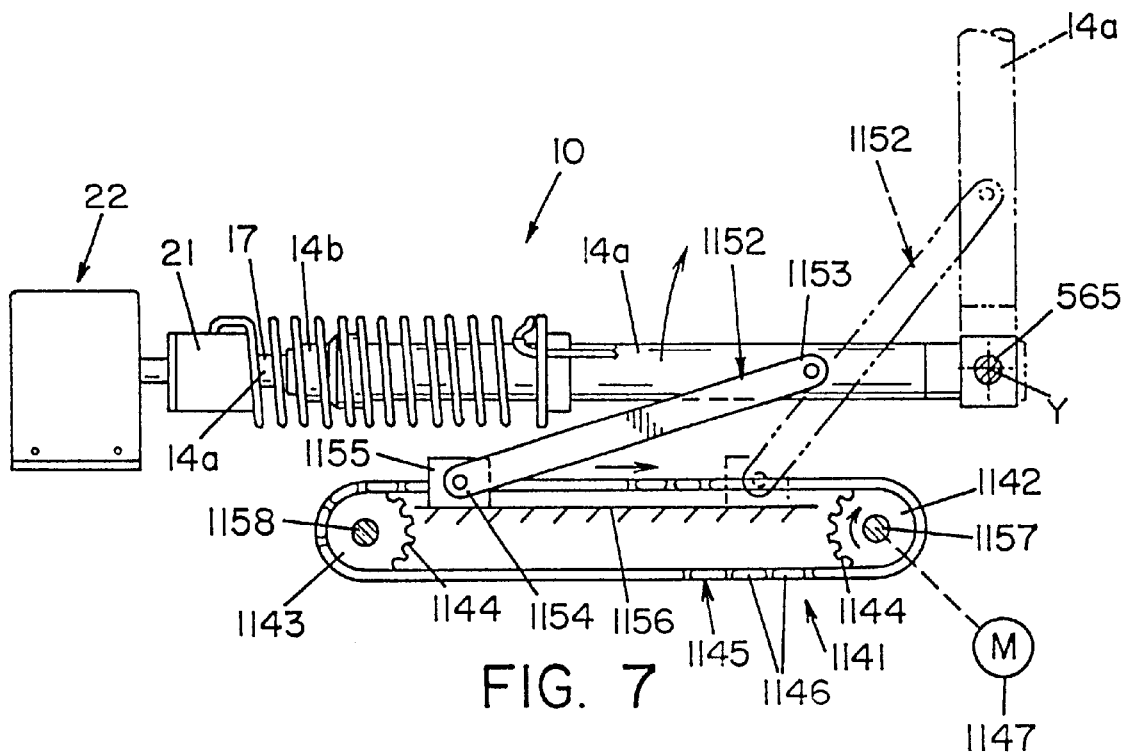

FIG. 7 shows another mechanical arrangement for pivoting mast 10 between a generally horizontal and a generally vertical position. The sprocket and chain system 1141 of FIG. 7 is used for mechanically pivoting telescoping mast 10 about axis Y. Sprocket and chain system 1141 includes sprockets 1142, 1143 having sprocket teeth 1144 for interengaging with chain 1145 made up of individual chain links 1146. Also included is a motor 1147 adapted to drive sprocket 1142, over which chain 1145 is trained. Sprocket and chain system 1141 also includes a lever arm 1152 having a mast end 1153 and a chain end 1154. Attached to chain 1145 is slide block 1155. Lever arm 1152 is pivotally attached at mast end 1153 to telescoping mast section 14a adjacent pivot axis Y, while chain end 1154 is attached to slide block 1155. Slide block 1155 is slidably supported upon a generally smooth surface 1156. As shown, the sprockets 1142, 1143 are rotatably supported by axles 1157, 1158, respectively, and chain 1145 is engaged with sprocket teeth 1144 of sprockets 1142, 1143 in a conventional manner.

Mast 10, as shown in the embodiment of FIG. 7 is pivoted from the horizontal to the vertical position thereof in the following manner. Motor 1147, when activated, rotates axle 1157 to turn sprocket 1142 in a clockwise direction, whereby chain 1145 is caused to turn in a clockwise direction. As chain 1145 moves clockwise, slide block 1155 moves along surface 1156 causing lever arm 1152 to assume the position as shown in phantom in FIG. 7. Mast 10 pivots about axis Y as lever arm 1152 lifts mast 10 from a generally horizontal position to a generally vertical position. Slide block 1155 may be stopped at any point along surface 1156 by deenergizing motor 1147, whereby, mast 10 is securely maintained at any desired angle between 0° and 90°. Slide block 1155 is compatible with surface 1156 so that little friction is present as slide block moves along plate surface 1156. It will be appreciated that the direction of the motor may be reversed causing sprocket 1142 to rotate in a counterclockwise direction so that mast 10 is moved from its vertical or tilt angle position to a generally horizontal position or to some angle therebetween.

It will be appreciated that both rack and pinion system 1120 and sprocket and chain system 1141 are preferably enclosed within a rectangular enclosure equivalent to rectangular enclosure 25 or 25'.

A control circuit board 61 is mounted to wall 31 within enclosure 24 by mounting pins 62. Control board 61 is linked to a power source, such as a 12V DC battery within vehicle 12. Signals from control board 61 operate rack and pinion system 581 in order to pivot mast 10 and air compressor 33 in order to extend and retract mast 10, as will be described in greater detail hereinafter. Also running from control board 61 is NYCOIL conduit 63. As will be appreciated from the prior art, NYCOIL is essentially coiled cable conduit having a hollow interior through which the necessary wiring to light source 22 is pulled. Wiring in NYCOIL conduit 63 provides DC power to light source 22 at upper mast end 17. NYCOIL conduit 63 is helical about the outer circumference of mast 10 and is capable of extending and retracting with mast 10. At upper mast end 17, NYCOIL conduit 63 terminates at wiring box assembly 21. Therein, the wiring then continues to remote control positioner enclosure 64.

Figure 4:
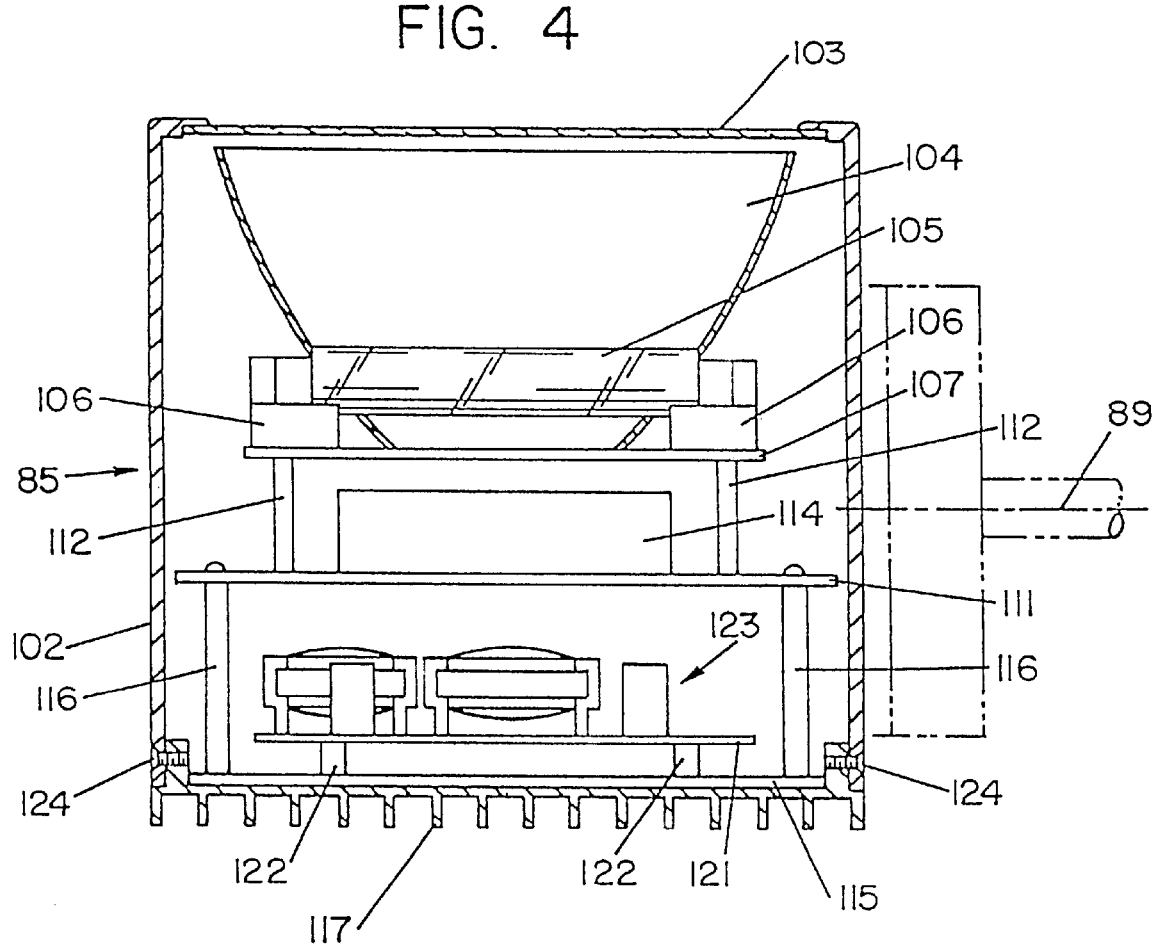
FIG. 4 is a cross-sectional view of one feature of the present invention taken along line 4—4 of FIG. 3.
Figure 5:
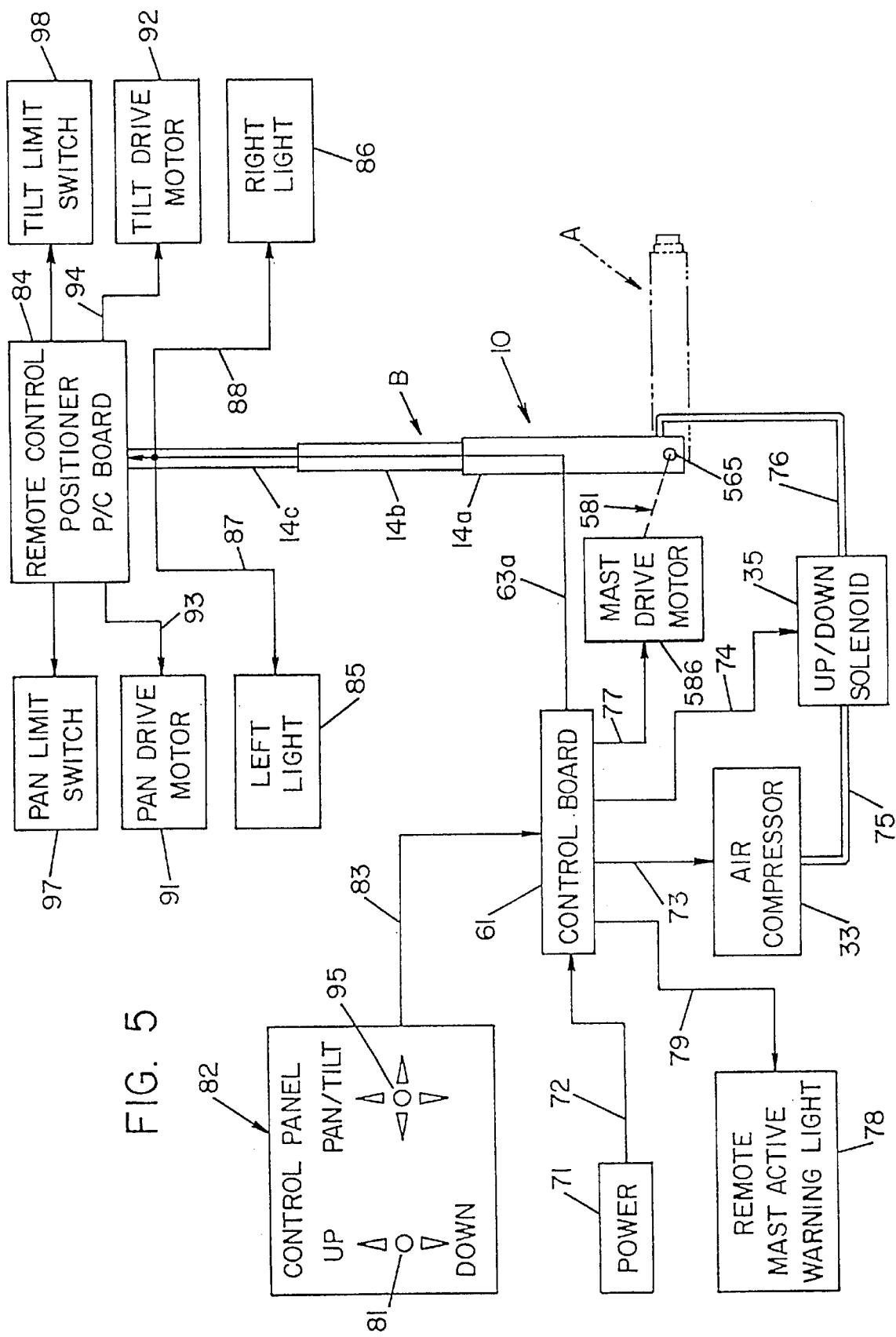
FIG. 5 is a flow diagram showing the overall control system for the present invention.

The operation of mast 10 and specifically light source 22 is best seen in FIGS. 4 and 5. DC power source 71, preferably 12 or 24 volt DC supply, is provided to control board 61 by a line 72. From control board 61 the signals for all of the mast operations are processed. Control board 61 is hooked to air compressor 33 by a line 73 and is wired to up/down solenoid valve 35 by a line 74. Upon a signal from control board 61, solenoid valve 35 utilizes air from air compressor 33, supplied by a supply line 75 to inflate mast 10 through an air supply line 76. Control board 61 also provides the signal to mast drive motor 586 through a line 77, which in turn actuates rack and pinion system 581 in order to move mast 10 from a horizontal to vertical position or vice versa. An operator can control each of these functions by the up/down switches 81 on a control panel 82 which provides the signals to control board 61 through the line 83. Remote mast active warning light 78, connected to control board 61 via line 79 is placed in the vehicle to alert the operator when light 22 is active.

DC power supply 71, through control board 61, powers remote control positioner PC board 84 by the wiring 63a in NYCOIL conduit 63 as well as providing power to the left light 85 and the right light 86 by the wiring line 87 and the wiring line 88, respectively. PC board 84 is located within remote control positioner enclosure 64, together with a pan drive motor 91 and a tilt drive motor 92 connected to PC board 84 by the lines 93 and 94, respectively. Control panel 82 allows an operator to control each of motors 91 and 92 by the pan/tilt switches 95. It will be appreciated that pan drive motor 91 causes light source 22 to rotate in a generally 360° configuration about a swivel point 96 between wiring box assembly 21 and positioner enclosure 64. Tilt drive motor 92 causes each of lights 85, 86 to pivot between horizontal and vertical positions about axis 89 to achieve better directional aiming of light source 22. The extent of rotation about swivel point 96 is limited by a pan limit switch 97, while the extent of tilt about axis 89 is controlled by a tilt limit switch 98.

Left light 85 is described in detail hereinafter. It will be appreciated that right light 86 is identical to left light 85 and thus such description will not be repeated for right light 86. As shown, an outer cover assembly 102 encloses light 85, with one side having a glass cover 103. A reflector 104 is opposite glass 103 while a bulb 105 is placed adjacent reflector 104. In the preferred embodiment, the bulb is a metal halide bulb. Bulb 105 is snapped into the lamp connecters 106 located on a reflector mating plate 107 from which reflector 104 extends. Reflector mating plate 107 is connected to a ballast mating plate 111 by the spacers 112 in order that left light 85 is properly balanced about axis 89. The ballast 114, generally a solid metal plate of known weight, is affixed to ballast mating plate 111. Ballast mating plate 111 is connected to a PC light board mating plate 115 by the supports 116. PC light board mating plate 115 is attached to a heat sink 117 and supports PC light board assembly 121 at the spacing screws 122. PC light board assembly 122 includes an electronic inverter 123 in which the DC signal from line 87 is converted to an AC signal before being sent to bulb 105. This arrangement eliminates the prior art requirements of an AC power source for the light. Light 85 is also provided with assembly screws 124. Upon removing assembly screws 124, the internal components of light 85 can be removed from within cover assembly 102 for repair of the light or replacement of the component parts, including bulb 105. This type of modular enclosure is not provided in prior art telescoping mast light enclosures. The AC lighting system of the prior art does not provide this versatility. Thus, the one piece modular mounting of internal components is another advantage of the present invention.

One of the advantages of the design of the present invention is the elimination of the heavy duty wiring and insulation previously required for AC lighting requirements. Such heavier gauge material is harder to expand and retract with the expansion and retraction of mast 10. This places requirements on air compressor 33 to provide greater air pressure to not only inflate mast sections 14a–14c, but also extend nycoil 63. A DC power source on the light also allows that rack and pinion system 581 need not be of a heavy duty type since it need not extend and hold excessive weight along the mast and at the end of the mast. A DC power source is also easier to connect and disconnect from a vehicle by simply connecting wires to the vehicle battery. The invention also eliminates the necessity seen in the prior art for multiple power sources. The invention allows that light source 22, which previously required an AC power source, now only requires a DC power source. DC power requirements also mean that the vehicle or generator need not be run at all times in order to operate light 22.

The invention has been described with reference to the preferred embodiments. Obviously, modifications and alterations will occur to others upon reading and understanding this specification. For example, control panel 82 can be placed within the vehicle or optionally made part of the remote hand held type, thus allowing positioning of light 22 from outside vehicle 12. Warning light 78 may also be placed on the control panel 82 or placed in both locations if control panel 82 utilizes the hand held remote option. It is intended to include all such modifications and alterations in so far as they come within the scope of the appended claims.

Having thus described the invention, it is claimed:

1. In a pneumatically telescoping mast supported for pivotal movement in opposite directions about a horizontal mast axis, said mast including adjacent telescoping sections slidable relative to one another between retracted and extended positions, means including pneumatic control means for displacing said mast sections between said retracted and extended positions, and means for pivoting said mast in opposite directions about said pivot axis between horizontal and vertical positions, the improvement comprising: said means for pivoting said mast between horizontal and vertical positions including drive wheel means, means for rotating said drive wheel means in opposite directions, and means including linkage means interconnecting said drive wheel means and said mast for rotation of said drive wheel means in one of said opposite directions to pivot said mast toward said vertical position and for rotation of said drive wheel means in the other of said opposite directions to pivot said mast toward said horizontal position; lighting means for illumination mounted to one of said adjacent telescoping sections; DC power supply means for providing electrical power to said mast system including providing power to said lighting means and said means for pivoting; and means for converting DC power to AC power whereby AC power is provided to said lighting means.

2. The telescoping mast of claim 1, wherein said means for converting includes an electronic inverter adjacent said light mount.

3. The mast of claim 1, wherein said means for converting is adjacent said lighting means.

4. The telescoping mast of claim 3, wherein said DC power supply means provides power to said pneumatic control means.

5. The mast of claim 3, wherein said mast has a bottom end adjacent said horizontal mast axis, and a top end opposite said bottom end, said lighting means including a light enclosure and a high intensity light within said enclosure, said light enclosure being attached to said mast adjacent said top end, said means for converting including an electrical converter, and said electrical converter being within said enclosure.

6. The telescoping mast of claim 3, wherein said DC power supply means includes battery supply means.

7. The telescoping mast of claim 6, wherein said battery supply means is a 12 volt supply.

8. The telescoping mast of claim 3, wherein said drive wheel means includes a pinion, and said linkage means includes rack means reciprocal in opposite directions by said pinion and gear means fixed on said mast coaxial with said pivot axis and engaging said rack means for pivotal displacement in opposite directions about said axis in response to reciprocation of said rack means.

9. The telescoping mast of claim 8, wherein said rack is linearly slidable relative to said pivot axis.

10. The telescoping mast of claim 8, wherein said rack is flexible and supported for displacement about said pivot axis with said gear means.

11. The telescoping mast of claim 3, wherein said drive wheel means includes a pinion, and said linkage means includes rack means and a lever arm, said rack means being reciprocal in opposite directions by said pinion, and said lever arm having opposite ends pivotally attached one to said mast and the other to said rack means.

12. The telescoping mast of claim 11, wherein said drive wheel means includes motor means for rotating said pinion.

13. The telescoping mast of claim 11, wherein said one end of said lever arm is attached to said mast at a lever arm axis spaced from said pivot axis.

14. The telescoping mast of claim 13, wherein said mast includes an upper end portion and a lower end portion, said lower end portion being adjacent said pivot axis, said rack means including a first end and a second end, said first end being adjacent said pivot axis when said mast is in said horizontal position, said one end of said lever arm being attached to said mast at said lower end portion, and said other end of said lever arm being attached to said rack means adjacent said second end.

15. The telescoping mast of claim 3, wherein said drive wheel means includes sprocket and chain means and said linkage means includes a lever arm having opposite ends pivotally attached one to said mast and the other to said sprocket and chain means.

16. The telescoping mast of claim 11, wherein said sprocket and chain means includes sprocket wheel means and chain means driven by said sprocket wheel means, said other end of said lever arm being attached to said chain means.

17. The telescoping mast of claim 16, wherein said chain means includes a chain and a slide block attached to said chain, said other end of said lever arm being attached to said slide block.

18. The telescoping mast of claim 17, further including means for slidably supporting said slide block, and said slide block being attached to said chain between said sprocket wheel means.

19. In a pneumatically telescoping mast supported for pivotal movement in opposite directions about a horizontal mast axis said mast including adjacent telescoping sections slidable relative to one another between retracted and extended positions, means including pneumatic control means for displacing said mast sections between said retracted and extended positions, and means for pivoting said mast in opposite directions about said pivot axis between horizontal and vertical positions, the improvement comprising: said means for pivoting said mast between horizontal and vertical positions including drive wheel means, means for rotating said drive wheel means in opposite directions, and means including linkage means interconnecting said drive wheel means and said mast for rotation of said drive wheel means in one of said opposite directions to pivot said mast toward said vertical position and for rotation of said drive wheel means in the other of said opposite directions to pivot said mast toward said horizontal position; lighting means for illumination mounted to one of said adjacent telescoping sections; DC power supply means for providing electrical power to said mast system including providing power to said lighting means and said means for pivoting; and means for converting DC power to AC power whereby AC power is provided to said lighting means, said means for converting being adjacent said lighting means.

20. The telescoping mast of claim 19, wherein said lighting means and said means for converting is provided in a single enclosed module.

21. The telescoping mast of claim 20, including means for releasably mounting said means for converting from within said single enclosed module.

22. The telescoping mast of claim 20, wherein said module includes a heat sink adjacent said means for converting.

23. The telescoping mast of claim 22, including means for releasably mounting said means for converting and said heat sink within said module whereby said means for converting and said heat sink are removable as a unit from said single enclosed module.

24. In a pneumatically telescoping mast supported for pivotal movement in opposite directions about a horizontal mast axis, said mast including adjacent telescoping sections slidable relative to one another between retracted and extended positions, means including pneumatic control means for displacing said mast sections between said retracted and extended positions, and means for pivoting said mast in opposite directions about said pivot axis between horizontal and vertical positions, the improvement comprising: said means for pivoting said mast between horizontal and vertical positions including drive wheel means, means for rotating said drive wheel means in opposite directions, and means including linkage means interconnecting said drive wheel means and said mast for rotation of said drive wheel means in one of said opposite directions to pivot said mast toward said vertical position and for rotation of said drive wheel means in the other of said opposite directions to pivot said mast toward said horizontal position; lighting means for illumination mounted to one of said adjacent telescoping sections said lighting means including a metal halide light; and DC power supply means for providing electrical power to said mast system including providing power to said lighting means and said means for pivoting.

25. The mast of claim 24, wherein said means for converting is adjacent said lighting means.

26. The mast of claim 25, wherein said mast has a bottom end adjacent said horizontal mast axis, and a top end opposite said bottom end, said lighting means including a light enclosure, said metal halide light being within said enclosure, said light enclosure being attached to said mast adjacent said top end, said means for converting including an electrical converter, and said electrical converter being within said enclosure.

27. In a pneumatically telescoping mast supported for pivotal movement in opposite directions about a horizontal mast axis, said mast including adjacent telescoping sections slidable relative to one another between retracted and extended positions, means including pneumatic control means for displacing said mast sections between said retracted and extended positions, and means for pivoting said mast in opposite directions about said pivot axis between horizontal and vertical positions, the improvement comprising: said means for pivoting said mast between horizontal and vertical positions including drive wheel means, means for rotating said drive wheel means in opposite directions, and means including linkage means interconnecting said drive wheel means and said mast for rotation of said drive wheel means in one of said opposite directions to pivot said mast toward said vertical position and for rotation of said drive wheel means in the other of said opposite directions to pivot said mast toward said horizontal position; lighting means for illumination mounted to one of said adjacent telescoping sections; DC power supply means for providing electrical power to said mast system including providing power to said lighting means, and said means for pivoting, said DC power supply means includes battery supply means, and said battery supply means is a 24 volt supply.

28. The mast of claim 27, wherein said means for converting is adjacent said lighting means.

29. The mast of claim 28, wherein said mast has a bottom end adjacent said horizontal mast axis, and a top end opposite said bottom end, said lighting means including a light enclosure and a high intensity light within said enclosure, said light enclosure being attached to said mast adjacent said top end, said means for converting including an electrical converter, and said electrical converter being within said enclosure.

30. A pneumatically telescoping mast for mounting on the roof of a motor vehicle and adapted for supporting an electrical fixture, said mast mounted on base plate means for removable affixing to said roof of said vehicle, comprising: means providing an axis about which said mast is adapted to pivot, said mast including adjacent telescoping sections slidable relative to one another between a retracted position and an extended position; means including pneumatic control means for pneumatically extending said mast from said retracted position to said extended position, and means for pivoting said mast between a generally horizontal position and a generally vertical position, said means for pivoting said mast including motor actuated drive means independently operable relative to said pneumatic control means, said drive means being movable in opposite directions, and means including linkage means interconnecting said drive means and said mast for movement of said drive means in one of said opposite directions to pivot said mast toward said vertical positions and for movement of said drive means in the other of said opposite directions to pivot said mast toward said horizontal position, said means for pivoting contained within a first housing on said base plate means, said pneumatic control means contained within a second housing on said base plate means; lighting means for illumination mounted to one of said adjacent telescoping sections; and DC power supply means for providing electrical power to said lighting means and said means for pivoting; and means for converting DC power to AC power whereby AC power is provided to said lighting means.

31. The mast of claim 30, wherein said means for converting is adjacent said lighting means.

32. The mast of claim 31, wherein said mast has a bottom end adjacent said horizontal mast axis, and a top end opposite said bottom end, said lighting means including a light enclosure and a high intensity light within said enclosure, said light enclosure being attached to said mast adjacent said top end, said means for converting including an electrical converter, and said electrical converter being within said enclosure.

33. In a mast supported for pivotal movement in opposite directions about a horizontal mast axis, including means for pivoting said mast in opposite directions about said mast axis between horizontal and vertical positions, the improvement comprising: said means for pivoting said mast between horizontal and vertical positions including drive wheel means, means for rotating said drive wheel means in opposite directions, and means including linkage means interconnecting said drive wheel means and said mast for rotation of said drive wheel means in one of said opposite directions to pivot said mast toward said vertical position and for rotation of said drive wheel means in the other of said opposite directions to pivot said mast toward said horizontal position; lighting means for illumination mounted to one of said adjacent telescoping sections; DC power supply means for providing electrical power to said mast system including providing power to said lighting means and said means for pivoting; and means for converting DC power to AC power whereby AC power is provided to said lighting means.

34. The mast of claim 33, wherein said means for converting is adjacent said lighting means.

35. The mast of claim 34, wherein said mast has a bottom end adjacent said horizontal mast axis, and a top end opposite said bottom end, said lighting means including a light enclosure and a high intensity light within said enclosure, said light enclosure being attached to said mast adjacent said top end, said means for converting including an electrical converter, and said electrical converter being within said enclosure.

36. The mast of claim 34, wherein said drive wheel means includes a pinion, and said linkage means includes rack means reciprocal in opposite directions by said pinion and gear means fixed on said mast coaxial with said pivot axis and engaging said rack means for pivotal displacement in opposite directions about said axis in response to reciprocation of said rack means.

37. The mast of claim 36, wherein said rack is linearly slidable relative to said pivot axis.

38. The mast of claim 36, wherein said rack is flexible and supported for displacement about said pivot axis with said gear means.

39. In a mast having a plurality of adjacent telescoping sections and being supported for pivotal movement in opposite directions about a horizontal mast axis said mast including a pivoting mechanism for rotating said mast in opposite directions about said mast axis between horizontal and vertical positions, the improvement comprising: said pivoting mechanism including a drive pinion, a motor for rotating said drive pinion in opposite directions a driven gear attached to said mast axis, and a slideable rack gear interconnecting said drive pinion and said driven gear of said mast, such that rotation of said drive pinion in one of said opposite directions pivots said mast toward said vertical position and rotation of said drive pinion in the other of said opposite directions pivots said mast toward said horizontal position; an enclosure containing a high intensity light for illumination, said light being mounted to one of said plurality of adjacent telescoping sections; a DC power supply providing electrical power to said mast system; and an electrical converter for converting DC power to AC power.

40. The mast of claim 39, wherein said means for converting includes an electronic inverter adjacent said light mount.

41. The mast of claim 39, wherein said lighting means and said means for converting is provided in a single enclosed module.

42. The mast of claim 39, wherein said mast has a bottom end adjacent said horizontal mast axis, and a top end opposite said bottom end, said lighting means including a light enclosure, said metal halide light being within said enclosure, said light enclosure being attached to said mast adjacent said top end, said means for converting including an electrical converter, and said electrical converter being within said enclosure.

43. A mast for mounting on the roof of a motor vehicle and adapted for supporting an electrical fixture, said mast mounted on base plate means for removable affixing to said roof of said vehicle, comprising: means providing an axis about which said mast is adapted to pivot, and means for pivoting said mast between a generally horizontal position and a generally vertical position, said means for pivoting said mast including motor actuated drive means, said drive means being movable in opposite directions, and means including linkage means interconnecting said drive means and said mast for movement of said drive means in one of said opposite directions to pivot said mast toward said vertical positions and for movement of said drive means in the other of said opposite directions to pivot said mast toward said horizontal position, said means for pivoting contained within a first housing on said base plate means; lighting means for illumination mounted to one of said adjacent telescoping sections; DC power supply means for providing electrical power to said lighting means and said means for pivoting; and means for converting DC power to AC power whereby AC power is provided to said lighting means.

44. The mast of claim 43, wherein said means for converting is adjacent said lighting means.

45. The mast of claim 44, wherein said mast has a bottom end adjacent said horizontal mast axis, and a top end opposite said bottom end, said lighting means including a light enclosure and a high intensity light within said enclosure, said light enclosure being attached to said mast adjacent said top end, said means for converting including an electrical converter, and said electrical converter being within said enclosure.

46. In a mast supported for pivotal movement in opposite directions about a horizontal mast axis, said mast including means for pivoting said mast in opposite directions about said horizontal mast axis between horizontal and vertical positions, the improvement comprising: said mast including lighting means for illumination mounted to one of said adjacent telescoping sections; DC power supply means for providing electrical power to said lighting means; and means for converting DC power to AC power whereby AC power is provided to said lighting means.

47. The mast of claim 46, wherein said DC power supply means provides power to said means for pivoting.

48. The mast of claim 46, wherein said means for converting includes an electronic inverter adjacent said light mount.

49. The mast of claim 46, wherein said DC power supply means includes battery supply means.

50. The mast of claim 46, wherein said lighting means and said means for converting is provided in a single enclosed module.

51. The mast of claim 50, wherein said module includes a heat sink adjacent said means for converting.

52. The mast of claim 50, including means for releasably mounting said module whereby said module is removable as a unit from said mast.

\* \* \* \* \*